United States Patent [19]

Ross et al.

[11] 4,235,420
[45] Nov. 25, 1980

[54] TWO PIECE CAST RATCHET WINCH

[75] Inventors: Karl J. Ross, Maumee; Francis B. Johnson, Defiance, both of Ohio

[73] Assignee: American Gage & Manufacturing Co., Wauseon, Ohio

[21] Appl. No.: 962,291

[22] Filed: Nov. 20, 1978

[51] Int. Cl.³ .......................................... A63B 61/04
[52] U.S. Cl. ................................. 254/218; 254/266; 74/149; 242/117
[58] Field of Search ............... 254/163, 164, 167, 169; 74/149, 154

[56] References Cited

U.S. PATENT DOCUMENTS

| | | | |
|---|---|---|---|
| 2,501,253 | 3/1950 | Anglemyer | 254/164 |
| 2,506,029 | 5/1950 | Maasdam | 254/164 |
| 2,669,426 | 2/1954 | Anglemyer | 254/164 |
| 3,724,811 | 4/1973 | Cain | 254/164 |
| 3,727,886 | 4/1973 | Cain | 254/167 |

Primary Examiner—Edward J. McCarthy
Attorney, Agent, or Firm—Beaman & Beaman

[57] ABSTRACT

The invention pertains to a winch construction for use with portable power pulls, the winch consisting of two cast portions interconnected by bolts wherein hub portions include opposed and engaging faces in which cable anchor and cable-receiving recesses are defined wherein, upon assembly, the winch accomodates the cable inner end and anchor within its hub configuration and the cable end is supported in such a manner to meet acceptable cable stress standards.

11 Claims, 7 Drawing Figures

TWO PIECE CAST RATCHET WINCH

BRIEF DESCRIPTION OF THE INVENTION

The invention pertains to a winch for portable power pulls wherein the winch is of a two piece cast construction and utilizes improvements for anchoring and guiding the winch cable inner end.

Tension producing apparatus commonly known as "power pulls" utilize a frame rotatably supporting a winch upon which a cable is wound. A frame-mounted dog selectively limits winch rotation to a single direction during cable winding as produced by a frame mounted operating lever. Anchors defined upon the frame and the cable permit high tension forces to be generated by the lever, and such power pulls are readily available in the market place, typical examples being shown in the assignee's U.S. Pat. Nos. 3,724,816 and 3,727,886.

Portable power pulls employ winches of both fabricated and cast constructions, such winches including hub portions axially defined by radially extending flanges for confining the wound cable. The periphery of one of the flanges is usually provided with ratchet teeth for engagement by the ratchet dog, and operating lever dog. As the inner end of the cable wound upon the winch must be firmly attached to the winch various winch designs have been used to anchor the cable inner end. Such anchors including slots and recesses defined in the hub, or a flange, but a winch construction which is of an economical construction and of sufficient strength to meet tension requirements has not previously been available which also supports the cable inner end in a positive manner permitting even cable winding, yet preventing an excessive bending angle at the cable inner end which would produce cable stresses, and ultimate failure. Safety standards now specify the acceptable degree of cable deformation at the winch, and previously constructed winches often are unable to meet present requirements.

It is an object of the invention to provide a winch for power pulls which is of an economical, yet high strength, construction, may be easily assembled to the power pull, and is capable of supporting the cable inner end in a positive manner to permit uniform cable winding and prevent excessive cable bending and stressing.

Another object of the invention is to provide a two-piece cast cable winch for power pulls wherein the winch portions are interconnected by bolts and engage at opposed radial faces in which recesses are defined for forming chambers for receiving the cable inner end ball anchor and adjacent cable end. The winch portions include a mating projection and recess to key the portions against relative angular displacement about the winch axis, and the winch construction simplifies cable replacement.

The winch portions may be cast or molded by injection equipment and formed of aluminum or other conventional cast material. The portions each include a cylindrical hub defined at one end by a radial extending flange having a circular periphery, and defined at the other end by a radial face. The face surfaces engage when the portions are assembled by axially extending bolts disposed upon opposite sides of the hub portions' shaft bore, and an axially extending projection defined upon one face surface is received within a complementary recess defined upon the other face to produce an interlocking key which resists relative winch portion rotation about the portion axes.

Each winch portion face also includes a cable anchor receiving recess and an intersecting cable receiving recess wherein, upon assembly, a cable anchor chamber and a cable end chamber are defined radially inwardly of the hub's cylindrical surface. The cable anchor chamber includes a spherical surface complementary to the ball anchor affixed to the cable inner end, and the cable chamber includes a convex surface tangentially merging with the hub outer cylindrical surface to minimize the cable bending angle and meet safety standards. The cylindrical cable anchor chamber receiving recess permit the cable end to align itself in accordance with the tension forces imposed thereon and the cable construction achieves maximum cable life and efficiency.

BRIEF DESCRIPTION OF THE DRAWINGS

The aforementioned objects and advantages will be apparent from the following description and accompanying drawings wherein.

DESCRIPTION OF THE PREFERRED EMBODIMENT

Figure 1:
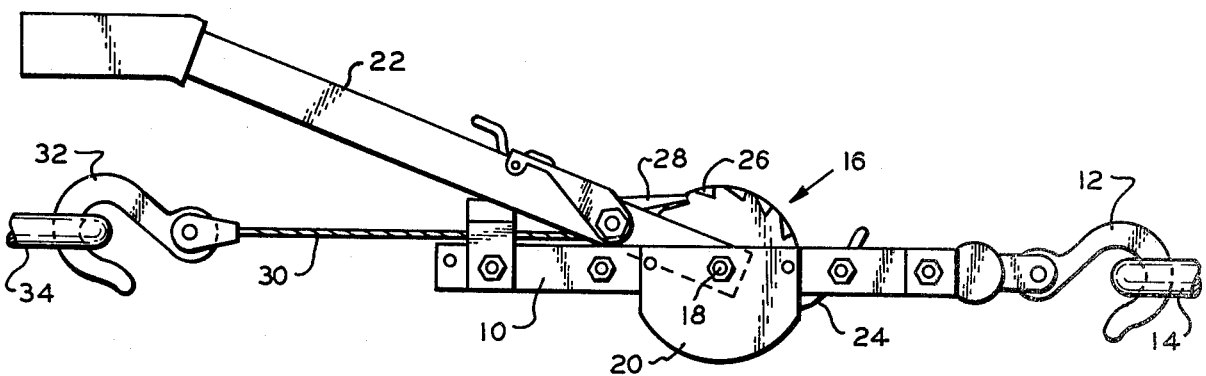
FIG. 1 is an elevational view of a power pull utilizing the cable winch construction of the invention.

A typical power pull utilizing a winch constructed in accord with the invention is illustrated in FIG. 1. The pull includes a metal frame 10 having an anchor hook 12 defined at one end for attachment to a fixed anchor indicated at 14. A winch 16 is rotatably mounted upon the frame 10 by the shaft 18, and the lower portion of the winch may be protected by a shield 20. The winch is rotated by the hand-operated lever 22 pivotally mounted upon the frame by the shaft 18, and a dog 24 pivotally spring biased upon the frame 1 engages the winch ratchet teeth 26 limiting the winch to a clockwise rotation during tensioning. Pivoting of the lever 22 is transferred to the winch 16 through lever mounted dog 28 wherein clockwise rotation of the lever indexes the winch in a like direction to tension cable 30 wound upon the winch and the cable tension force through hook 32 is transferred to the member to be pulled as indicated at 34. The construction of a typical power pull is described in greater detail in the assignee's U.S. Pat. No. 3,727,886.

Figure 2:
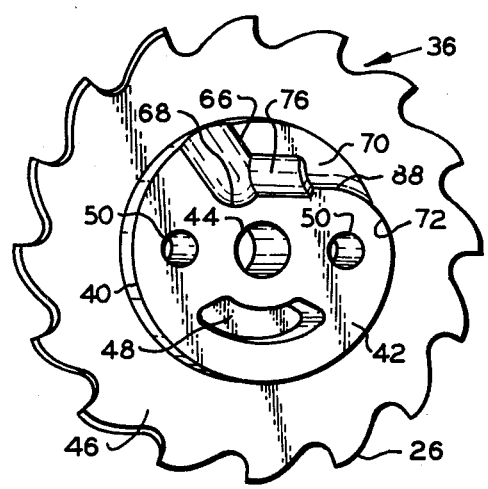
FIG. 2 is a perspective view of the cable winch portion upon which the ratchet teeth are defined.
Figure 3:
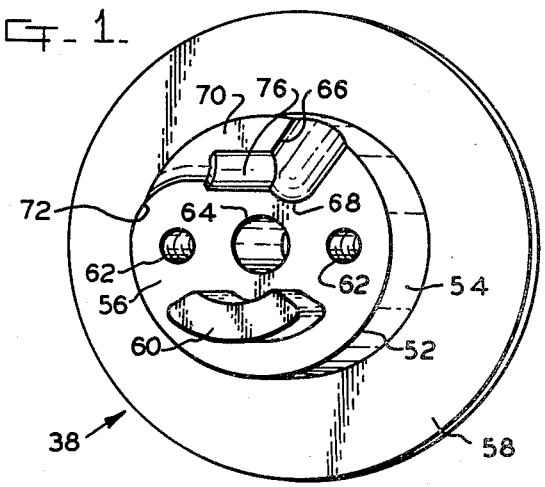
FIG. 3 is a perspective view of the other winch portion.
Figure 4:
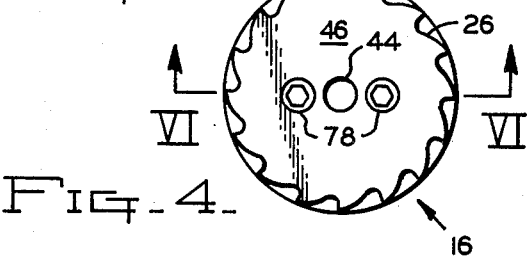
FIG. 4 is an end elevational view of the assembled cable winch.
Figure 5:
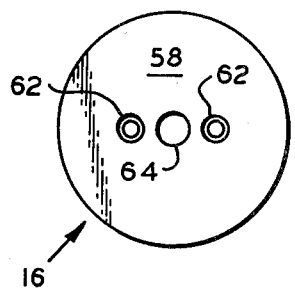
FIG. 5 is an elevational view of the other end of the winch assembly.

The winch construction of the invention can best be appreciated from FIGS. 2 and 3 wherein it will be appreciated that the two-part winch consists of portions 36 and 38. The winch portions are cast or molded, preferably injection molded, of aluminum or similar moldable metal alloy.

Figure 6:
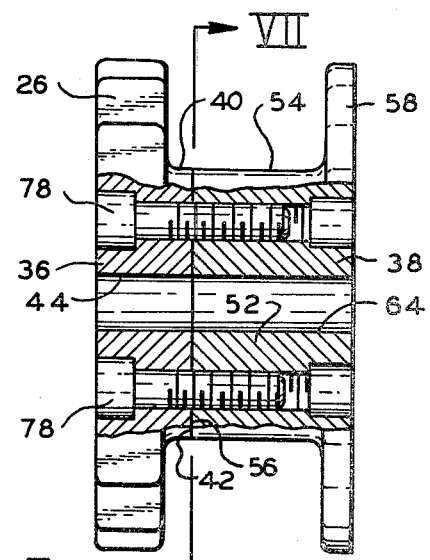
FIG. 6 is a plan, sectional view as taken along Section VI—VI of FIG. 4.

The portion 36 includes a hub 40 defined by a cylindrical surface, and axially defined by the planar face 42 perpendicularly disposed to the central shaft receiving bore 44. A radial extending flange 46 defines the other end of the hub and ratchet teeth 26 are cast into the flange periphery. A key receiving recess 48 is defined in the hub intersecting face 42 radially displaced from the bore 44, and a pair of bolt receiving holes 50 are defined upon opposite sides of the bore 44. The holes 50 are countersunk, FIG. 6, to receive the heads of the assemblying bolts, as will be later apparent.

The winch portion 38 also includes a hub 52 having a cylindrical surface 54 which is axially defined at one end by the face surface 56, and at the other end by the radially extending flange 58 which includes a cylindrical outer periphery. The axial dimension of the flange 58 is less than that of flange 46, FIG. 6, in view of the greater axial dimension being necessary to impart sufficient strength to the ratchet teeth 26. A key projection 60 axially extends from the face 56 and is of a transverse cross section similar to that of recess 48 wherein the projection 60 will be closely received within the recess during winch assembly. A pair of threaded holes 62 are axially defined in hub 52 on opposite sides of the shaft receiving bore 64 for receiving the assembly bolts.

Identical cable anchor and cable receiving configurations are formed in the faces 42 and 56 of each winch portion, and these configurations, as mirror images of each other, may be described with respect to one winch portion.

The cable anchor receiving recess defined in the faces includes an approximately radially extending cylindrical segment 66 intersecting the associated cylindrical hub surface and including an inner surface 68 constituting a spherical segment. A cable receiving recess 70 also intersects the associated cylindrical hub surface, and intersects the anchor recess surface 66. The recess 70 further includes a convex surface 72 which tangentially blends into the associated cylindrical hub surface, and is of such a radius as to meet the government standards with respect to winch cable bending.

Figure 7:
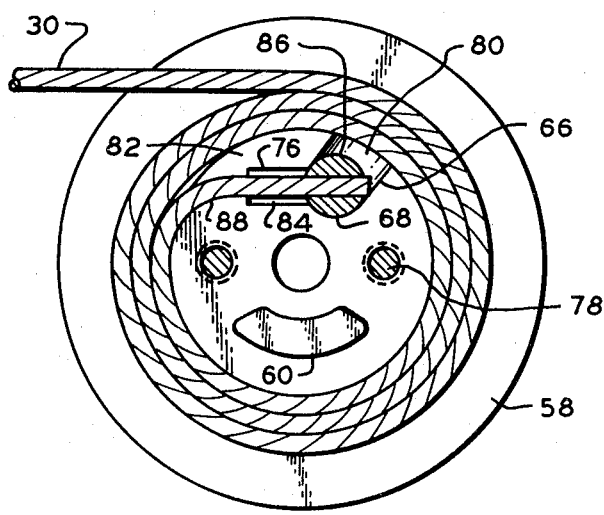
FIG. 7 is an elevational, sectional view of the assembled winch having a cable wound thereon as taken along Section VII—VII of FIG. 6.

The cable receiving recess 70 includes a deeper recess 76 of a cylindrical segment portion which intersects the surface 68, the axis of the cylindrical segment 76 intersecting the center of the spherical segment surface 68, and the diameter of the recess 76 is greater than the diameter of the cable 30 passing therethrough, as will be apparent in FIG. 7.

The winch portions 36 and 38 are assembled by a pair of headed Allen bolts 78 which extend through holes 50 and mate with the threads of holes 62. The Allen bolts will firmly draw the faces 42 and 56 into tight contiguous relationship, the projection 60 being received within recess 48, and the recesses 66, 70 and 76 being in opposed relationship. When assembled the recesses 66 define a cable anchor receiving chamber 80, the recesses 70 defines a radial slot 82 for receiving the cable, and the recesses 76 define a partial cylindrical chamber 84 adjacent the cable anchor chamber.

The inner end of the cable 30 includes a spherical ball anchor 86 firmly affixed to the cable end by swaging or other mechanical connection. The ball 86 includes a diametrical bore receiving the cable end, and the ball is of a diameter slightly less than the spherical surfaces 68. Thus, upon the ball 86 being received within chamber 80 the ball and cable will orient itself within the chambers 80 and 84 as apparent in FIG. 7. The cable end adjacent the ball extends through the chamber 84, and the cable follows the contour of surfaces 72 as it is laid upon the winch hub.

The aforedescribed relationship between the winch and cable permits the anchor ball 86 to align itself with the tension forces within the cable 30 minimizing localized stress points within the cable. The chamber 84 provides clearance for the cable adjacent the ball to prevent interference with this self-aligning action, and the slot convex surface 88 is so located as to accurately align with the cable circumference when under tension.

It will be appreciated that the two part winch construction of the invention makes a significant contribution to the power pull winch art, and it is appreciated that various modifications may be apparent to those skilled in the art without departing from the spirit and scope of the invention.

We claim:

1. In a power pull comprising a frame having an anchor defined thereon, a ratchet winch rotatably mounted on said frame having a retaining dog, a cable wound on said winch, and an operating lever pivotally mounted on said frame operatively associated with said ratchet winch, the improvement comprising said winch constituting first and second molded portions, said portions each including a hub portion and a flange portion each having a periphery, ratchet teeth defined on the periphery of one of said flange portions, said portions each including an axial shaft receiving bore concentrically extending through said hub portions and a radially extending hub portion face adapted to engage the face of the other hub portion, a cable anchor recess defined in said hub face of each hub portion, a cable receiving recess defined in said hub face of each hub portion of lesser axial dimension than said cable anchor recesses, said cable receiving recesses intersecting the associated cable anchor recess and the associated hub portion periphery, and releasable fastening means maintaining said first and second winch portions in assembled relation with said hub portion faces in engagement wherein said cable anchor recesses together defined a cable anchor chamber and said cable receiving recesses together define a cable chamber adjacent said cable anchor chamber.

2. In a power pull as in claim 1, an axially extending key projection defined on one of said hub portions projecting from the face thereof, and an axially extending key recess defined in the other hub portion intersecting the face thereof having a radial cross section complementary to that of said projection whereby said key projection and recess closely interlock upon assembly of said winch portions.

3. In a power pull as in claim 1 wherein said cable receiving recesses each include a convex surface tangentially intersecting the associated hub portion periphery preventing excessive bending of the cable within said cable chamber.

4. In a power pull as in claim 1 wherein said cable receiving recesses each include an enlarged linear groove intersecting the associated cable anchor receiving recess whereby upon assembly of said winch portions said grooves define a linear passage adjacent said cable anchor chamber of greater transverse cross section than the cable wound on said winch.

5. In a power pull as in claim 1 wherein said cable anchor recesses each include a spherical segment surface adjacent the intersection of said cable anchor and cable receiving recesses.

6. In a power pull as in claim 1 wherein said fastening means comprise axially extending threaded bolts, threaded bolt receiving holes defined in one of said winch portions and bolt receiving holes defined in the other winch portion.

7. A winch for a power pull comprising, in combination, first and second molded portions, said portions each including a hub portion and a flange portion each having a periphery, ratchet teeth defined on the periphery of one of said flange portions, said portions each including an axial shaft receiving bore concentrically extending through said hub portions and a radially extending hub portion face adapted to engage the face of the other hub portion, a cable anchor recess defined in said hub face of each hub portion, a cable receiving recess defined in said hub face of each hub portion of lesser axial dimension than said cable anchor recesses, said cable receiving recesses intersecting the associated cable anchor recess and the associated hub portion periphery, mutually interfitting keying means defined upon said hub portions' faces, and releasable fastening means maintaining said first and second winch portions in assembled relation with said hub portions faces in engagement wherein said keying means interfit, said cable anchor recesses together define a cable anchor chamber and said cable receiving recesses together define a cable chamber adjacent said cable anchor chamber.

8. In a winch for a power pull as in claim 7, said keying means comprising an axially extending key projection defined on one of said hub portions projecting from the face thereof, and an axially extending key recess defined in the other hub portion intersecting the face thereof having a radial cross section complementary to that of said projection whereby said key projection and recess closely interlock upon assembly of said winch portions.

9. In a winch for a power pull as in claim 7, wherein said cable receiving recesses each include a convex surface tangentially intersecting the associated hub portion periphery preventing excessive bending of the cable within said cable chamber.

10. In a winch for a power pull as in claim 7, wherein said cable receiving recesses each include an enlarged linear groove intersecting the associated cable anchor receiving recess whereby upon assembly of said winch portions said grooves define a linear passage adjacent said cable anchor chamber of greater transverse cross section than the cable wound on said winch.

11. In a winch for a power pull as in claim 7 wherein said cable anchor recesses each include a spherical segment surface adjacent the intersection of said cable anchor and cable receiving recesses.

* * * * *